Patented Nov. 24, 1931

1,833,250

UNITED STATES PATENT OFFICE

PAUL GROSSMANN, OF BASEL, SWITZERLAND, ASSIGNOR TO THE FIRM OF SOCIETY OF CHEMICAL INDUSTRY IN BASLE, OF BASEL, SWITZERLAND

PROCESS OF MAKING CONDENSATION PRODUCTS OF THE ANTHRACENE SERIES AND ANTHRAQUINONE DERIVATIVES

No Drawing. Application filed January 30, 1931, Serial No. 512,504, and in Switzerland February 1, 1930.

The present invention relates to the manufacture of condensation products of the anthracene series which, by oxidation, are converted into anthraquinone derivatives which are valuable acetate silk dyestuffs and of which a number are new. It comprises the process of making these new products, the new products themselves, and the material that has been dyed with the new products.

In the co-pending application Ser. No. 512,503, it has been shown that the condensation of leuco-anthraquinone derivatives of the general formula

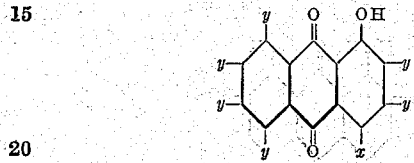

wherein $x$ stands for OH or NHR (R=H or alkyl), and $y$ stands for H or any substituents, with amines of the general formula $NH_2R_1$ ($R_1$=H, alkyl or aralkyl) may essentially be facilitated with addition of boric acid. The products thus obtained, in the form of the anthraquinone derivatives, are valuable acetate silk dyestuffs.

It has now been found that with the leuco compounds of the sulfonated products corresponding with the general formula

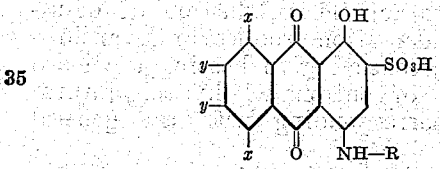

wherein one of the $x$ stands for H or NHR, and the other for H or OH, wherein further the $y$ standing in ortho-position to H or to the NHR-group means H and the $y$ standing in ortho-position to the OH-group means H or $SO_3H$, and wherein finally R stands for hydrogen or alkyl, the conversion with the said amino compounds occurs with splitting off of the sulfo-group, forming products having equal tinctorial properties, if the condensation is carried out without boric acid. Such splitting off of the sulfo-groups with simultaneous condensation has not been described hitherto.

If in the anthraquinone derivative or the leuco compound thereof an $NH_2$-group stands in para-position to the exchanged OH-group, and if the reaction medium consists of an aqueous solution of an organic base, substitution of an $NH_2$-group by an NHR-group (R being the organic radicle of the organic base) may occur simultaneously with the exchange of the OH-group.

As to their constitution the products obtainable according to the present invention are comparable with those of the co-pending application Ser. No. 512,503. The effect which is obtained according to the latter application, i. e. far-reaching condensation with use of small quantities of compounds of the general formula $NH_2R$ (R=H, alkyl or aralkyl), may in the present case be effected by use of a larger excess of the base and under more energetic conditions (stronger concentration, higher temperature, higher pressure).

The condensation products, due to their being unsulfonated, are valuable acetate silk dyestuffs if they are reconverted into true anthraquinone derivatives by oxidation. This oxidation, during the condensation, may occur more or less completely. It may also be effected after the condensation. For example it already occurs if the products, for the purpose of obtaining fine pastes, are dissolved in sulfuric acid and precipitated in water.

The following examples illustrate the invention, the parts being by weight:—

*Example 1*

5.2 parts of sodium 1:5-dihydroxy-4:8-diamino-anthraquinone-2:6-disulfonate, together with 4.6 parts of sodium hydrosulfite, are heated in 25 parts by volume of an aqueous ammonia solution of 33 per cent. strength for 5 hours in a closed vessel at 100° C. The whole is filtered and the solid matter washed with hot water and dried; it is a condensation product which dissolves in sulfuric acid to a yellow solution and in ethyl acetate to a blue solution. After re-precipitation from sulfuric acid and suspension by means of sulfite cellulose solution it dyes acetate silk powerful blue tints.

The reaction has very probably occurred according to the following equation:

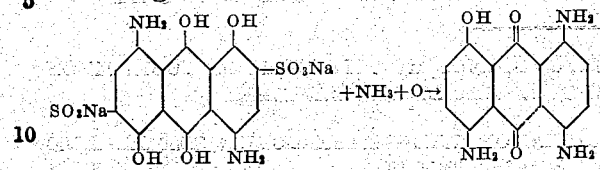

Example 2

5.2 parts of sodium 1:8-dihydroxy-4:5-diaminoanthraquinone-2:7-disulfonate in 50 parts of water are heated with 1.8 parts of methylamine and 4.6 parts of sodium hydrosulfite for 20-30 minutes in a boiling water bath. The product is filtered, washed with hot water and dried. There are obtained about 2.6 parts of dyestuff which dissolves in an organic solvent to a blue solution and dyes acetate silk in a suitable suspension intensely blue.

The reaction has very probably occurred according to the following equation:

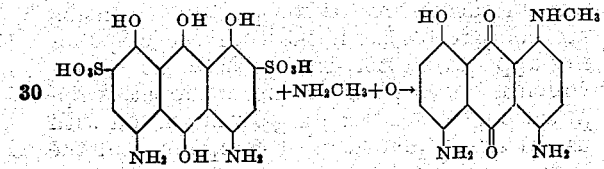

Example 3

5.2 parts of sodium 1:5-dihydroxy-4:8-diaminoanthraquinone-2:6-disulfonate, together with 4.6 parts of sodium hydrosulfite are heated in 25 parts by volume of aqueous methylamine solution of 20 per cent. strength for 4 hours at 100° C. in a closed vessel. After filtering and washing while hot there is obtained, on drying, a condensation product which dissolves in sulfuric acid to a yellow solution and in ethylacetate to a blue solution. After re-precipitation from sulfuric acid, whereby complete oxidation occurs, and suspension by means of sulfite cellulose solution it dyes acetate silk powerful pure blue tints, which in artificial light appear somewhat greener. The oxidized condensation product is probably 1:5-diamino-4-hydroxy-8-methylaminoanthraquinone corresponding with the formula

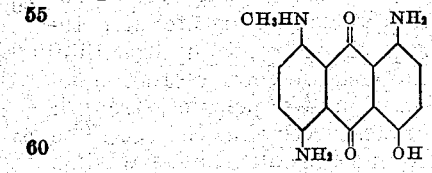

Instead of methylamine there may be used in the foregoing examples a homologue or substitution product thereof, such as β-hydroxyethlamine, ethylenediamine or benzylamine. Instead of 1:5 dihydroxy-4:8-diaminoanthraquinone-2:6-disulfonic acid or 1:8-dihydroxy-4:5-diaminoanthraquinone-2:7-disulfonic acid there may be used mixtures and derivatives of the two bodies, the operation being otherwise similar. The mono-sulfonic acids can also be substituted for the disulfonic acids.

Example 4

3.55 parts of 1-amino-4-hydroxyanthraquinone-3-sulfonic acids (sodium salt) are heated in a closed vessel at 100° C. for 4 hours with 3 parts of sodium hydrosulfite and 25 parts of an aqueous solution of methylamine of 20 per cent. strength. The reaction mass is filtered and the solid matter washed with hot water and dried; there are thus obtained about 2.2 parts of 1:4-dimethyldiaminoanthraquinone. When converted in a suitable manner into a suspension, the product dyes acetate silk pure blue shades.

What I claim is:—

1. Process for the production of desulfonated condensation products of the anthracene series, consisting in heating the leuco derivatives of sulfonated hydroxyanthraquinones corresponding with the general formula

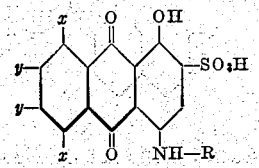

wherein one of the $x$ stands for H or NHR, and the other for H or OH, wherein further the $y$ standing in ortho-position to H or to the NHR-group means H and the $y$ standing in ortho-position to the OH-group means H or $SO_3H$, and wherein finally R stands for hydrogen or alkyl, with amines of the general formula $NH_2R_1$ ($R_1$ standing for hydrogen, alkyl, or aralkyl) in presence of water.

2. Process for the production of desulfonated condensation products of the anthracene series, consisting in heating the leuco derivatives of sulfonated hydroxyanthraquinones corresponding with the general formula

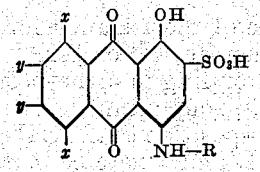

wherein one of the $x$ stands for NHR, and the other for OH, wherein further the $y$ standing in ortho-position to the NHR-group means H and the $y$ standing in ortho-position to the OH-group means H or $SO_3H$, wherein further R means hydrogen or alkyl, with amines of the general formula $NH_2R_1$ ($R_1$ standing for hydrogen, alkyl or aralkyl) in presence of water.

3. Process for the production of desulfonated condensation products of the anthracene series, consisting in heating the leuco derivative of a hydroxyanthraquinone corresponding with the formula

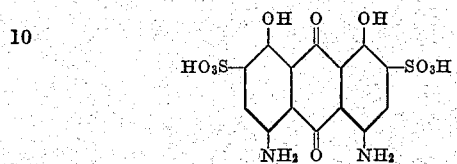

with amines of the general formula $NH_2R_1$ ($R_1$ standing for hydrogen, alkyl or aralkyl) in presence of water.

4. Process for the production of desulfonated condensation products of the anthracene series, consisting in heating the leuco derivative of a hydroxyanthraquinone corresponding with the formula

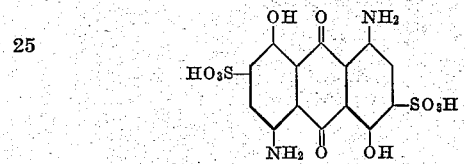

with methylamine in presence of water.

5. Process for the production of desulfonated condensation products of the anthracene series, consisting in heating the leuco derivative of a hydroxyanthraquinone corresponding with the formula

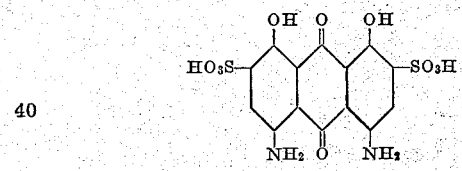

with methylamine in presence of water.

6. As a new product of the anthraquinone series the 1-methylamino-4:8-diamino-5-hydroxyanthraquinone, which product forms a dark powder, dissolving in sulfuric acid to a yellow, and in acetic ester to a greenish blue solution, and dyeing acetate silk similar tints.

In witness whereof I have hereunto signed my name this 20th day of January, 1931.

PAUL GROSSMANN.